(12) United States Patent
Lee et al.

(10) Patent No.: US 9,758,117 B2
(45) Date of Patent: Sep. 12, 2017

(54) BUMPER APPARATUS FOR VEHICLE

(71) Applicant: Hyundai Motor Company, Seoul (KR)

(72) Inventors: Seung Mok Lee, Osan-si (KR); Young Sub Oh, Suwon-si (KR); Jin Young Yoon, Gimpso-si (KR); Bock Cheol Lee, Suwon-si (KR); Hyun Gyung Kim, Hwaseong-si (KR); Dong Eun Cha, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 96 days.

(21) Appl. No.: 14/830,386

(22) Filed: Aug. 19, 2015

(65) Prior Publication Data

US 2016/0297386 A1 Oct. 13, 2016

(30) Foreign Application Priority Data

Apr. 8, 2015 (KR) ........................ 10-2015-0049577

(51) Int. Cl.
| | |
|---|---|
| *B60R 19/02* | (2006.01) |
| *B60R 21/36* | (2011.01) |
| *B60R 19/20* | (2006.01) |
| *B60R 19/48* | (2006.01) |

(52) U.S. Cl.
CPC .......... *B60R 19/023* (2013.01); *B60R 19/205* (2013.01); *B60R 19/48* (2013.01); *B60R 21/36* (2013.01)

(58) Field of Classification Search
CPC ........ B60R 21/36; B60R 19/20; B60R 19/205
USPC ...................... 410/117; 293/117; 296/187.04
See application file for complete search history.

(56) References Cited

U.S. PATENT DOCUMENTS

| | | | | |
|---|---|---|---|---|
| 8,752,860 | B2* | 6/2014 | Kim ...................... | B60R 19/205 280/728.2 |
| 2003/0075373 | A1* | 4/2003 | Sawa ...................... | B60R 21/36 180/271 |
| 2007/0057490 | A1* | 3/2007 | Deflorimonte .......... | B60R 21/36 280/730.1 |
| 2012/0132475 | A1* | 5/2012 | Kim ...................... | B60R 19/205 180/274 |
| 2013/0119681 | A1* | 5/2013 | Mendis ................... | B60R 21/36 293/107 |
| 2013/0140102 | A1* | 6/2013 | Chung .................. | B60R 19/205 180/274 |

FOREIGN PATENT DOCUMENTS

| | | | | |
|---|---|---|---|---|
| CH | GB 2458680 A | * | 9/2009 | ........... B60R 19/205 |
| JP | EP 1024063 A2 | * | 8/2000 | ............. B60R 21/36 |
| JP | 2008-80869 A | | 4/2008 | |
| JP | 2008-254497 A | | 10/2008 | |
| JP | 2013-001386 A | | 1/2013 | |

(Continued)

*Primary Examiner* — Hilary Gutman
(74) *Attorney, Agent, or Firm* — Morgan, Lewis & Bockius LLP

(57) ABSTRACT

A bumper apparatus for a vehicle may include an airbag module and a rotary member. The airbag module has an airbag cushion to be deployed through a bumper. The rotary member rotatably is provided on a vehicle body, and coupled at an end to a bumper portion that is removable by a force generated when the airbag cushion is deployed. The rotary member is rotatable about the vehicle body along with the bumper portion when the airbag cushion is deployed.

8 Claims, 4 Drawing Sheets

(56) References Cited

FOREIGN PATENT DOCUMENTS

| | | | |
|---|---|---|---|
| JP | 2013-241161 A | 12/2013 | |
| KR | 10-2012-0010500 A | 2/2012 | |
| KR | 10-2014-0014927 A | 2/2014 | |
| KR | 10-2014-0085889 A | 7/2014 | |
| SE | WO 2007097666 A1 * | 8/2007 | ............. B60R 21/36 |
| WO | WO 02055337 A2 * | 7/2002 | ........... B60R 19/205 |

* cited by examiner

BUMPER APPARATUS FOR VEHICLE

CROSS-REFERENCE(S) TO RELATED APPLICATION

The present application claims priority of Korean Patent Application Number 10-2015-0049577 filed on Apr. 8, 2015, the entire contents of which application are incorporated herein for all purposes by this reference.

BACKGROUND

Technical Field

The present invention relates to a bumper apparatus for a vehicle. More particularly, the invention relates to a bumper apparatus for a vehicle, which is configured to prevent the removal and flying of a bumper when a cushion of an external airbag is deployed.

Description of the Related Art

A vehicle is equipped with various kinds of safety apparatuses so as to protect a driver and a passenger against an unexpected situation. Representative examples of the safety apparatuses include an airbag apparatus that is intended to directly protect the driver and the passenger sitting in seats.

In the event of a vehicle collision, such an airbag apparatus is configured such that compressed gas is instantaneously injected into an airbag by an impact force, and the airbag is inflated rapidly by the compressed gas, thus protecting a passenger.

Such a conventional airbag apparatus is an internal airbag apparatus that is deployed inside a vehicle, and can protect a passenger inside the vehicle. However, the conventional airbag apparatus is problematic in that it cannot protect an ego-vehicle colliding with an external object, other vehicles, and pedestrians.

Therefore, recently, attempts are made to protect the vehicle and reduce an injury of a pedestrian when the vehicle collides with an obstacle or the pedestrian. As one example of the attempts, an external airbag apparatus is proposed.

Such an external airbag deploys the cushion to the front of a vehicle prior to a collision when sensing an obstacle, thus increasing an energy absorbing space and thereby reducing an impact force acting on a passenger in the vehicle and reducing an injury of the passenger, in addition to decreasing external damage to the vehicle.

Meanwhile, if the external airbag is installed between the bumper and a back beam, the cushion is deployed from the inside to the outside of the bumper while breaking the bumper. However, pressure generated by the deployment of the cushion may result in removing or flying a part of the bumper as well as components of a bumper assembly, and consequently the flying components may cause an injury of a pedestrian.

The information disclosed in this Background section is only for enhancement of understanding of the general background of the invention and should not be taken as an acknowledgement or any form of suggestion that this information forms the prior art already known to a person skilled in the art.

SUMMARY

The present invention provides a bumper apparatus for a vehicle, which is configured to prevent the removal and flying of a bumper when a cushion of an external airbag is deployed.

In one aspect, the present invention provides bumper apparatus for a vehicle, including: an airbag module having an airbag cushion to be deployed through a bumper; and a rotary member rotatably provided on a vehicle body, and coupled at an end thereof to a bumper portion that is removable by a force generated when the airbag cushion is deployed, wherein the rotary member is rotatable about the vehicle body along with the bumper portion when the airbag cushion is deployed.

The rotary member may be rotatably coupled to a stiffener secured to the vehicle body.

The rotary member may include: a fastening portion formed at an end of the rotary member and to be fastened to an inner surface of the bumper; and support portions, a first end of each support potion coupled to an end of the fastening portion via a hinge structure, wherein each support portion may be formed with an arc-shaped contact portion on a middle portion of the support portion and corresponding to an outer surface of the stiffener so that the stiffener may be rotatably fitted between the contact portions of the support portions.

The fastening portion may be integrally or monolithically formed with each of the support portions, wherein each support portion may be bent from the fastening portion towards the stiffener and a junction between the fastening portion and the support portion may form the hinge structure.

The fastening portion may be pinned to each support portion such that a junction between the fastening portion and the support portion may form the hinge structure.

Second ends of the support portions may be fastened to each other via a fastening means. A second end of each of the support portions may extend outwardly.

A friction reduction means may be provided between the contact portion and the stiffener. The friction reduction means may be provided on an inner surface of the contact portion facing the stiffener.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to exemplary embodiments thereof illustrating the accompanying drawings which are given herein below by way of illustration only, and thus are not limitative of the present invention, and wherein.

Figure 1:
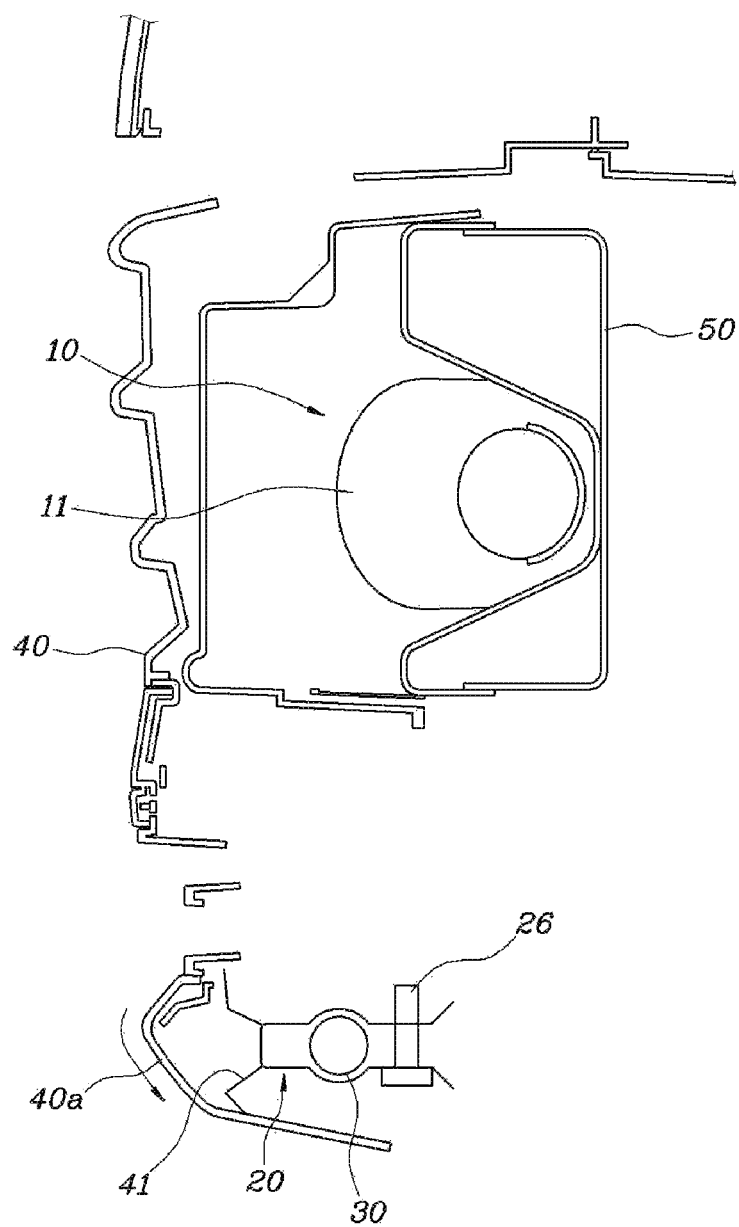
FIG. 1 is a view illustrating an exemplary bumper apparatus in which a rotary member is coupled to a lower portion of a bumper according to the present invention.

It should be understood that the appended drawings are not necessarily to scale, presenting a somewhat simplified representation of various preferred features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover the exemplary embodiments as well as various alternatives, modifications, equivalents and other embodiments; which may be included within the spirit and scope of the invention as defined by the appended claims.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described in detail with reference to the accompanying drawings.

A bumper apparatus for a vehicle according to some embodiments of the present invention includes an airbag module 10 and a rotary member 20.

Figure 2:
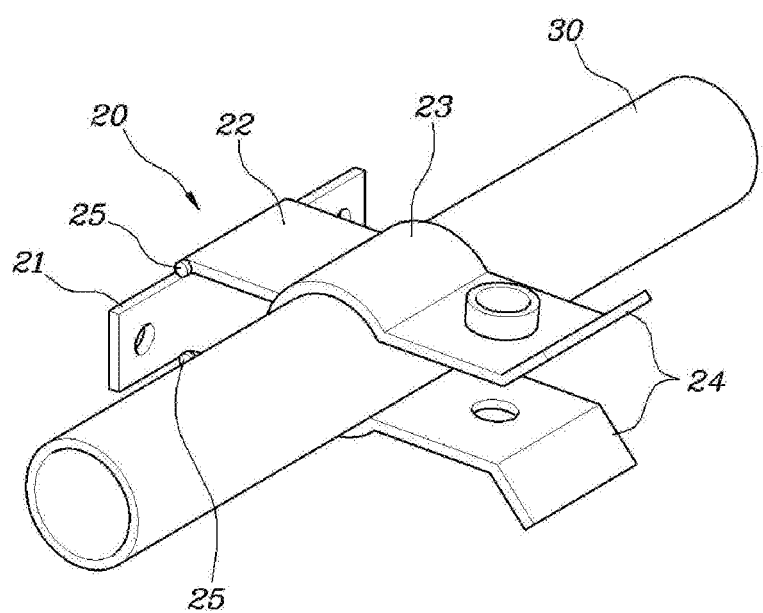
FIG. 2 is a view illustrating an exemplary bumper apparatus in which the rotary member is coupled to a stiffener according to the present invention.
Figure 3:
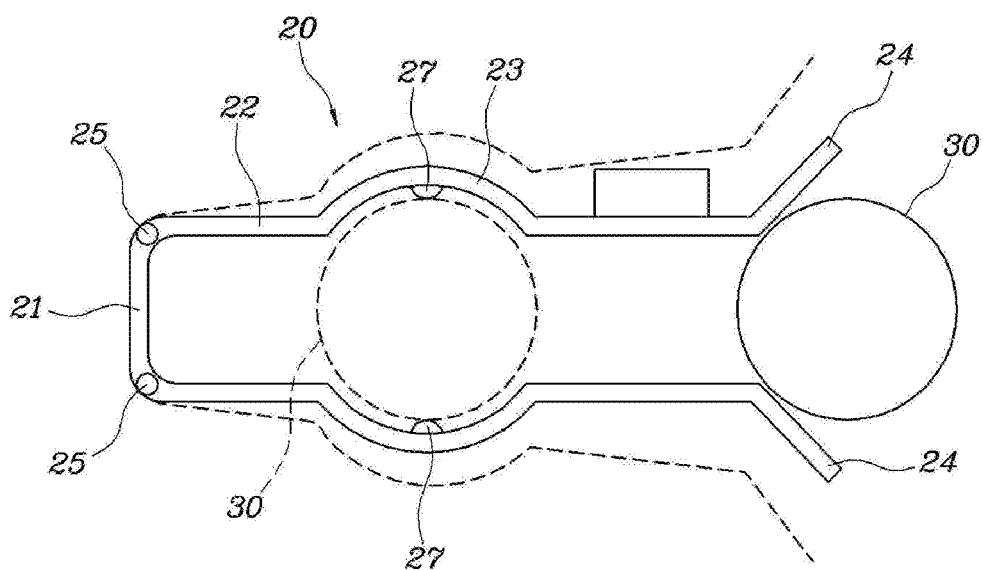
FIG. 3 is a view illustrating a coupling relationship between the stiffener and the rotary member fitted therein, and a coupled state of a friction reduction means in an exemplary bumper apparatus according to the present invention.

Referring to FIGS. 1 to 3, the airbag module 10 of the present invention specifically may include an airbag cushion 11, an inflator and the like, and may be configured such that the airbag cushion 11 is deployed through a bumper 40.

For example, the airbag module 10 may be provided between a back beam 50 and the bumper 40. Since the airbag module 10 is mounted to a rear end of the bumper 40, the airbag cushion 11 breaks and passes through the inside of the bumper 40 while being deployed to the outside of the bumper 40 by a pressure generated when the airbag cushion 11 is deployed, In addition, the rotary member 20 may be rotatably provided in a vehicle body. Further, an end of the rotary member 20 is coupled to a bumper portion 40a that may be removed or fly by a force generated when the airbag cushion 11 is deployed. Thereby, when the airbag cushion 11 is deployed, the rotary member 20 is rotatable about the vehicle body along with the bumper portion 40a.

For example, the bumper portion 40a that may be removed or fly as described above may be a lower portion 40a of the bumper 40, as shown in FIG. 1. This portion may be a portion that is removed or separated from a main body of the bumper 40 by a strong pressure generated when the airbag cushion 11 is deployed.

In such a configuration, when the lower end portion 40a of the bumper 40 is separated from the main body of the bumper 40 by a pressure generated when the airbag cushion 11 is deployed, the separated lower end portion 40a of the bumper is rotated about the vehicle body along with the rotary member 20 because the lower end portion 40a of the bumper 40 is rotatably coupled to the vehicle body via the rotary member 20.

Accordingly, this prevents the lower end portion 40a of the bumper 40 or other components constituting the bumper from being removed or fly from the main body of the bumper 40, thus reducing the danger of causing an injury to a pedestrian due to the removed components.

In addition, in some embodiments, the vehicle body to which the rotary member 20 is coupled may be a stiffener 30, and the rotary member 20 may be rotatably provided on the stiffener 30 while surrounding the stiffener 30 secured to the vehicle body.

For example, since the stiffener 30 may be secured to a lower end or an upper end of the back beam 50, it may be longitudinally provided in a direction from left to right of the vehicle. Thereby, the rotary member 20 may be rotatably provided on the stiffener 30 secured to the lower end or the upper end of the back beam 50.

Further, the stiffener 30 may be formed to have a circular cross-section. The rotary member 20 may be rotatably fitted into the stiffener 30.

Referring to FIGS. 2 and 3, the configuration of the rotary member 20 will be described in more detail.

The rotary member 20 has on an end thereof a fastening portion 21 having the shape of a rectangular plate. The fastening portion 21 may be attached to an inner surface of the bumper 40.

For example, both ends of a bracket 41 may be coupled to the fastening portion 21 and the bumper 40 to couple the fastening portion 21 with the bumper 40.

Further, an end of a support portion 22 may be connected to each of upper and lower ends of the fastening portion 21 via a hinge structure 25.

As an example of the hinge structure 25, the fastening portion 21 and the support portion 22 may be integrally connected to each other. The support portion 22 may be bent from each of opposite ends of the fastening portion 21 towards the stiffener 30 in a bow shape. That is, a junction between the fastening portion 21 and the support portion 22 may form a physical hinge structure 25 by an elastic restoring force of a material itself.

As another example of the hinge structure 25, the fastening portion 21 may be pinned to the support portion 22. That is, the junction between the fastening portion 21 and the support portion 22 may form a mechanical hinge structure 25 using a pin.

According to such a configuration, both support portions 22 form the hinge structures 25 with the fastening portion 21, thus making it easy and convenient to insert the stiffener 30 between both the support portions 22.

Particularly when the fastening portion 21 is integrally connected with each support portion 22, as described above, the support portion 22 is hingedly rotated about the fastening portion 21 while having the elastic restoring force. Thus, it is possible to prevent the rotary member 20 from being removed from the stiffener 30 without separate technical means for fixing both the support portions 22.

In addition, an arc-shaped contact portion 23 corresponding to an outer surface of the stiffener 30 is formed on a middle region of the support portion 22, so that the stiffener 30 is rotatably fitted between both the contact portions 23.

That is, an inner surface of each of facing contact portions 23 is formed in the shape of a concave arc. The shape of the concave arc corresponds to that of the outer circumference of the stiffener 30, thus allowing the rotary member 20 to be more stably and firmly fitted into the stiffener 30 without the shaking of the rotary member 20.

Further, according to some embodiments of the present invention, other ends of the support portions 22 may be fastened to each other by a fastening means 26.

In such a configuration, the upper and lower support portions 22 may be fastened to each other through a bolt fastening method, thus completely preventing the rotary member 20 from being removed from the stiffener 30.

In addition, according to some embodiments of the present invention, the other end of the support portion 22 may be formed in the shape of a flared portion 24 that is enlarged outwards.

That is, the other ends of the support portions 22 are bent, respectively, upwards and downwards with respect to an imaginary central axis between both the support portions 22. Thus, at a location near the other end, a distance between the support portions 22 is increased. Therefore, the flared portions 24 make it easier and more convenient to insert the stiffener 30 between the support portions 22, thus improving workability when the bumper 40 is assembled.

Moreover, according to some embodiments of the present invention, a friction reduction means may be provided between the contact portion 23 and the stiffener 30.

Figure 4:
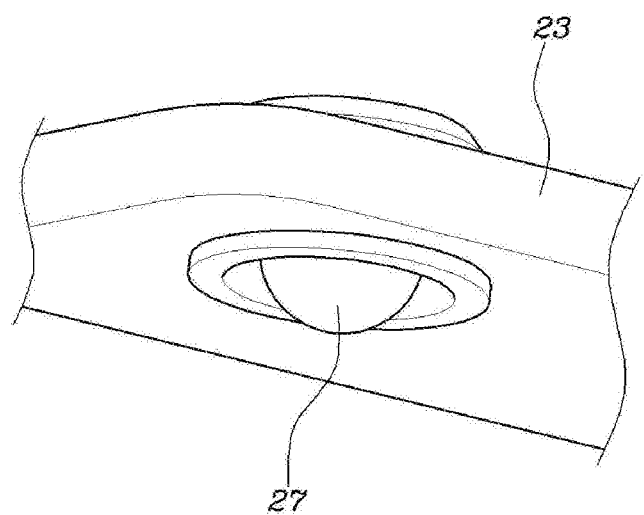
FIG. 4 is a view illustrating a state in which a ball roller is applied as the friction reduction means of an exemplary bumper apparatus according to the present invention.

For example, as shown in FIG. 4, the friction reduction means may be a ball-shaped roller 27 provided on an inner surface of the contact portion 23 facing the stiffener 30. Here, the ball-shaped roller 27 is only one example of the friction reduction means. Thus, it is possible to apply any suitable roller such as a rolling-contact-type roller or a sliding-contact-type roller as well as the ball-shaped roller 27.

Therefore, even if both the other ends of the support portions 22 are strongly fastened to each other so as to prevent the rotary member 20 from being removed from the stiffener 30, the friction reducing action using the ball allows the rotary member 20 to be smoothly rotated in a direction in which the bumper 40 rotates.

As described herein, the present invention provides a bumper apparatus, which prevents a lower end portion of a bumper or components constituting the bumper from being removed and flying from a main body of the bumper by a pressure generated when an airbag cushion is deployed, thus reducing the danger of causing an injury to a pedestrian due to the removed component.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A bumper apparatus for a vehicle, comprising:
   an airbag module having an airbag cushion to be deployed through a bumper; and
   a rotary member rotatably provided on a vehicle body, and coupled at an end thereof to a bumper portion that is removable by a force generated when the airbag cushion is deployed,
   wherein the rotary member is configured to surround a stiffener secured to the vehicle body, and rotatable downward to the bumper about the stiffener of the vehicle body along with the bumper portion when the airbag cushion is deployed.

2. The bumper apparatus of claim 1, wherein the rotary member comprises:
   a fastening portion formed at an end of the rotary member and to be fastened to an inner surface of the bumper; and
   support portions, a first end of each support potion coupled to an end of the fastening portion via a hinge structure, wherein each support portion is formed with an arc-shaped contact portion on a middle portion of the support portion and corresponding to an outer surface of the stiffener so that the stiffener is rotatably fitted between the contact portions of the support portions.

3. The bumper apparatus of claim 2, wherein the fastening portion is integrally or monolithically formed with each of the support portions, wherein each support portion is bent from the fastening portion towards the stiffener and a junction between the fastening portion and the support portion forms the hinge structure.

4. The bumper apparatus of claim 2, wherein the fastening portion is pinned to each support portion such that a junction between the fastening portion and the support portion forms the hinge structure.

5. The bumper apparatus of claim 2, wherein second ends of the support portions are fastened to each other via a fastening means.

6. The bumper apparatus of claim 2, wherein a second end of each support portion extends outwardly.

7. The bumper apparatus of claim 2, wherein a friction reduction means is provided between the contact portion and the stiffener.

8. The bumper apparatus of claim 7, wherein the friction reduction means is provided on an inner surface of the contact portion facing the stiffener.

\* \* \* \* \*